(12) United States Patent
Chou (10) Patent No.: US 7,379,557 B2
(45) Date of Patent: May 27, 2008

(54) COMMUNICATION HEADSET WITH AUXILIARY POSITIONING DEVICE

(75) Inventor: Ching-Tsai Chou, Tai-Chung Hsien (TW)

(73) Assignee: AirDigit Incorporation, Hsinchu (TW)

( * ) Notice: Subject to any disclaimer, the term of this patent is extended or adjusted under 35 U.S.C. 154(b) by 550 days.

(21) Appl. No.: 11/020,741

(22) Filed: Dec. 22, 2004

(65) Prior Publication Data

US 2006/0147034 A1    Jul. 6, 2006

(51) Int. Cl.
*H04R 25/00*    (2006.01)
(52) U.S. Cl. .................................. 381/374; 381/370

(58) Field of Classification Search ............... 381/374, 381/375, 376, 377, 378, 380, 385; 181/130, 181/131, 132; 379/430; 455/41.1, 420, 455/426.1, 569.1, 575.2
See application file for complete search history.

(56) References Cited

U.S. PATENT DOCUMENTS 6,819,762 B2 *  11/2004  Jones et al. ................. 381/380

* cited by examiner

*Primary Examiner*—Brian Ensey (57) ABSTRACT

A headset includes a body and an earphone securely connected to the body. An auxiliary positioning device is provided on the body so that, after the earphone is inserted into an ear channel and the auxiliary positioning device is urged against a concha cartilage, the headset is positioned.

11 Claims, 11 Drawing Sheets

COMMUNICATION HEADSET WITH AUXILIARY POSITIONING DEVICE

BACKGROUND OF THE INVENTION

1. Field of the Invention

The present invention generally relates to a communication headset, and more particularly to the communication headset having an auxiliary positioning device formed on a body of the headset to help position the headset to the concha.

2. Description of Related Art

Because using a cell phone while driving is causing hundreds and thousands of casualties, a headset is developed to the market so that cell phone users need not hold the cell phone anymore and can still talk to the other side. The headset is divided into two categories, depending on the design, one is the wireless headset, and the other one is the wired headset. Nevertheless, the wireless headset is the most popular one nowadays.

Figure 1:
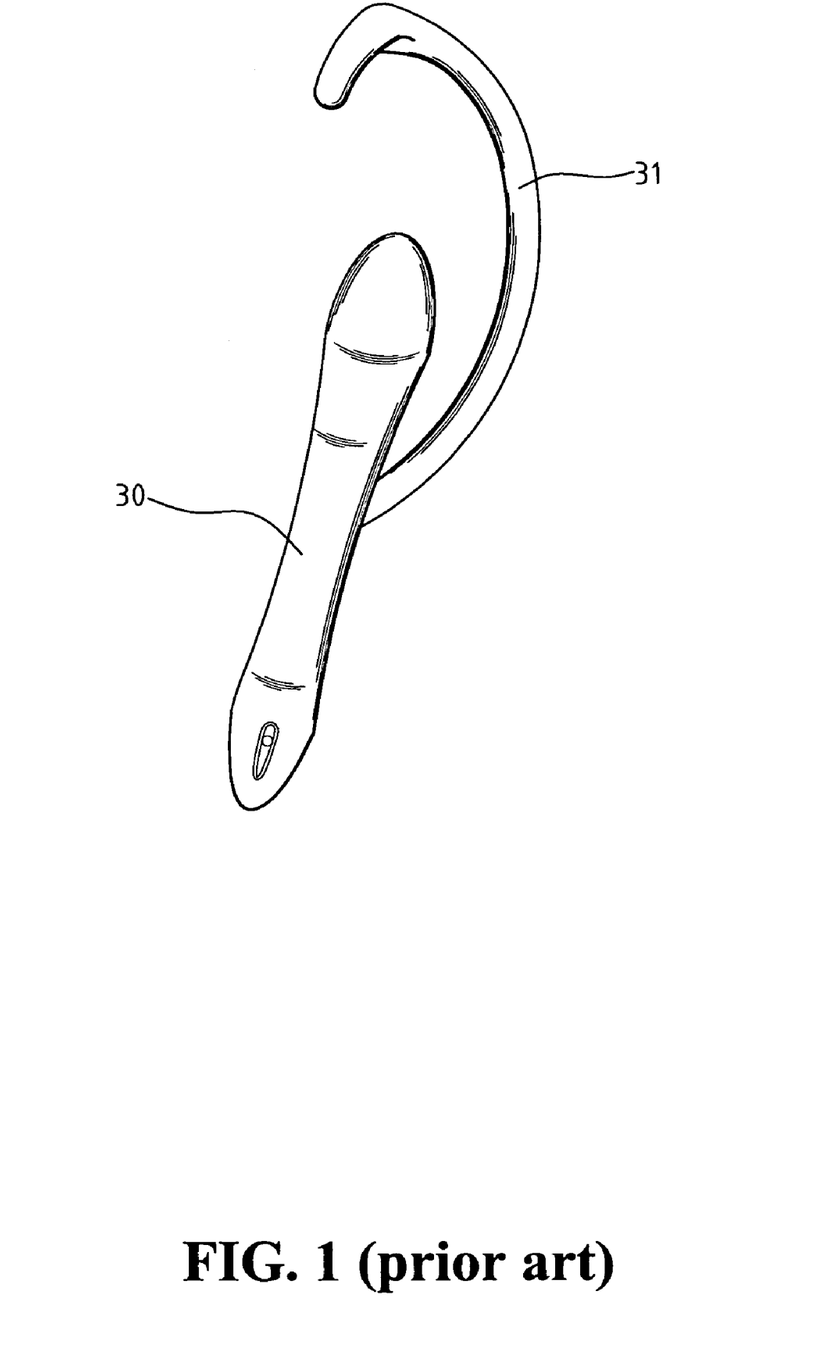
FIG. 1 is a perspective view of a conventional communication headset.

With reference to FIG. 1, a first conventional communication headset has a body 30 and an arcuate hook 31 formed with the body 30 and extending out of the body. When the communication headset is used, the body 30 is placed adjacent to the ear and the arcuate hook 31 is placed on the concha using the concha to support the weight of the communication headset. Since there is no positioning device to help stabilizing the communication headset, the communication headset is easily displaced and thus the user is not able to have a quality reception. Further, due to the hook design, it is not possible for the user to switch ear for using the communication headset. Furthermore, due to the frequent movement of the communication headset, the user is not feeling comfortable using this communication headset. What's more but not the least is that the joint between the arcuate hook 31 and the body 30 is easily broken, which damages the communication headset for good.

Figure 2:
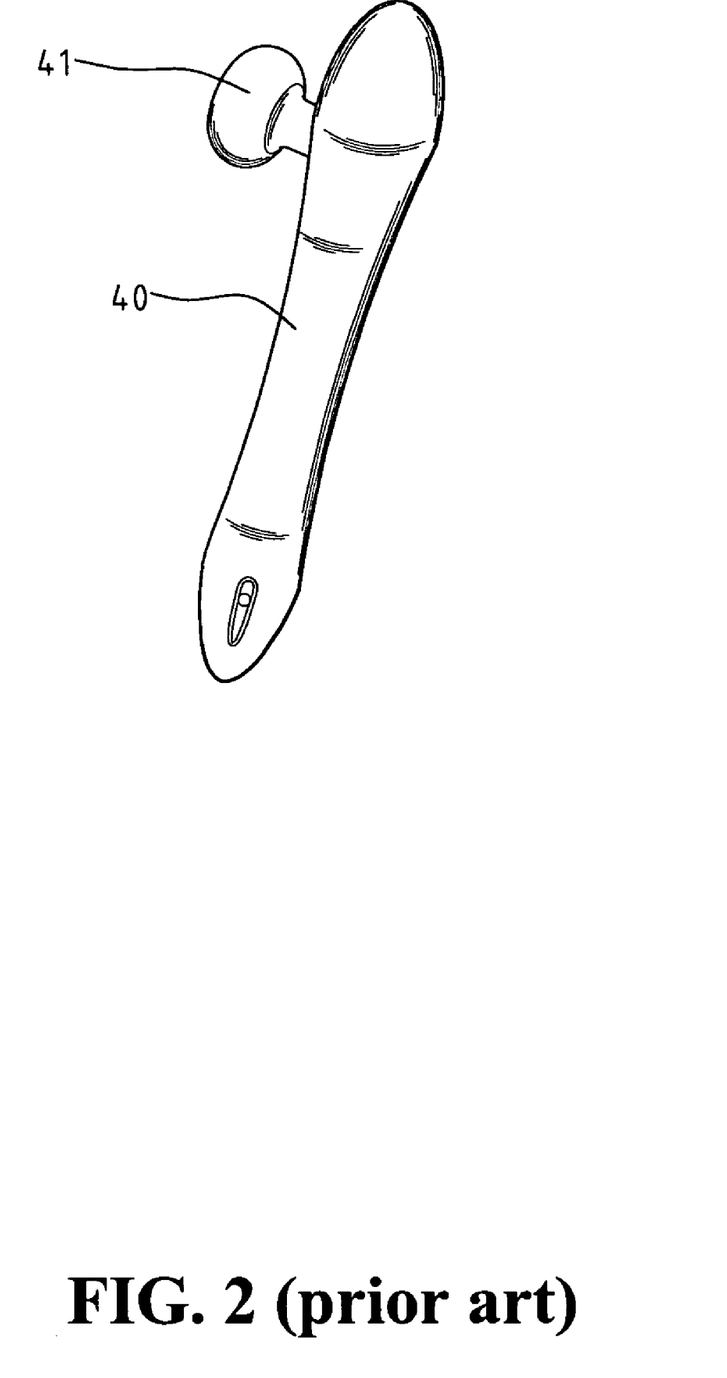
FIG. 2 is a perspective view of a different communication headset.

With reference to FIG. 2, a different conventional communication headset is shown and has a body 40 and a plug 41 formed on a side face of the body 40. When this conventional headset is used, the plug 41 is placed inside the ear channel of the user and then the communication headset is ready for use. Because there is no hook design, there is no breakage problem and thus the user is able to freely switch ear for using this hookless communication headset. Still, this design does not effectively stabilize the communication headset, which makes the user very uncomfortable.

Other objects, advantages, and novel features of the invention will become more apparent from the following detailed description when taken in conjunction with the accompanying drawings

SUMMARY OF THE INVENTION

The primary objective of the present invention is to provide an improved communication headset having an auxiliary positioning device formed on the body of the communication headset to position the headset for both the right and left ears. In one embodiment, the auxiliary positioning device includes a boss extended out from the body above the earphone of the headset and an arcuate ledge extended on a peripheral edge of a top portion of the body. In a situation where the communication headset is used in the first ear, the boss is positioned against the cartilage above the earlobe of the first ear. In another situation where the communication headset is rotated 180 degrees and used in the second ear, the arcuate ledge is positioned against the cartilage on an upper portion of the second ear.

Other objects, advantages, and novel features of the invention will become more apparent from the following detailed description when taken in conjunction with the accompanying drawings.

DETAILED DESCRIPTION OF PREFERRED EMBODIMENT

Figure 3:
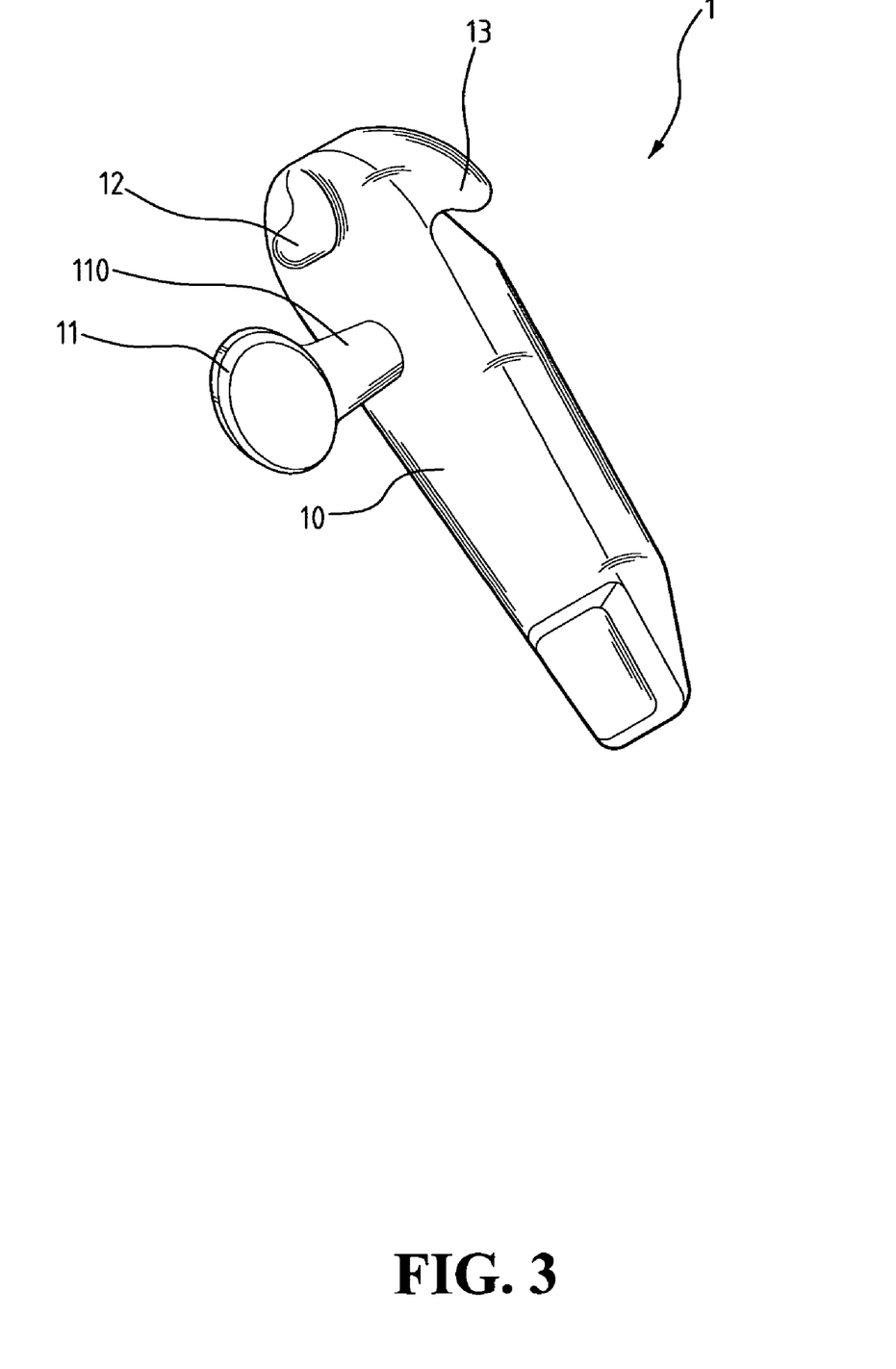
FIG. 3 is a perspective view of the communication headset of the present invention.
Figure 4:
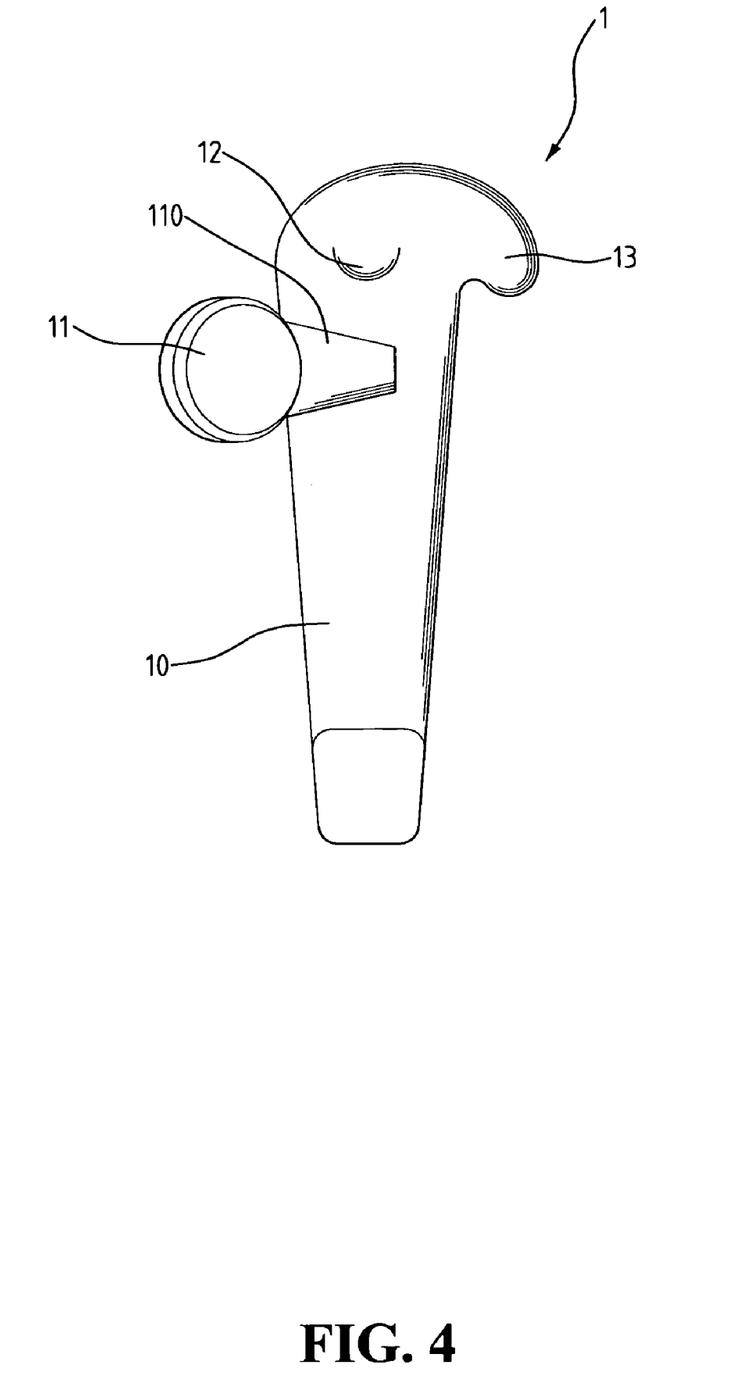
FIG. 4 is a front view of the headset shown in FIG. 3.

With reference to FIGS. 3 and 4, it is noted that the headset 1 constructed in accordance with the present invention includes a slender and elongated body 10 with a connection post 110 extending from a side face of the body 10. The free end of the connection post 110 is provided with an earphone 11. It is noted that the connection post 110 is bent and extended from the side face of the body 10. A boss 12 is formed on a top portion of the body 10 and close to the earphone 11. An end face of the boss 12 is flat or arcuate. A distance between the boss 12 and the earphone 11 is equal or slightly larger than that between the ear channel and the concha of a human. Further, an arcuate ledge 13 is formed on a peripheral edge of the top portion of the body 10 to correspond to the shape of the concha of the human. The arcuate ledge 13 is extending oppositely to the earphone 11. A distance between the arcuate ledge 13 and the earphone 11 is slightly larger than that between the ear channel and the concha cartilage.

Figure 5:
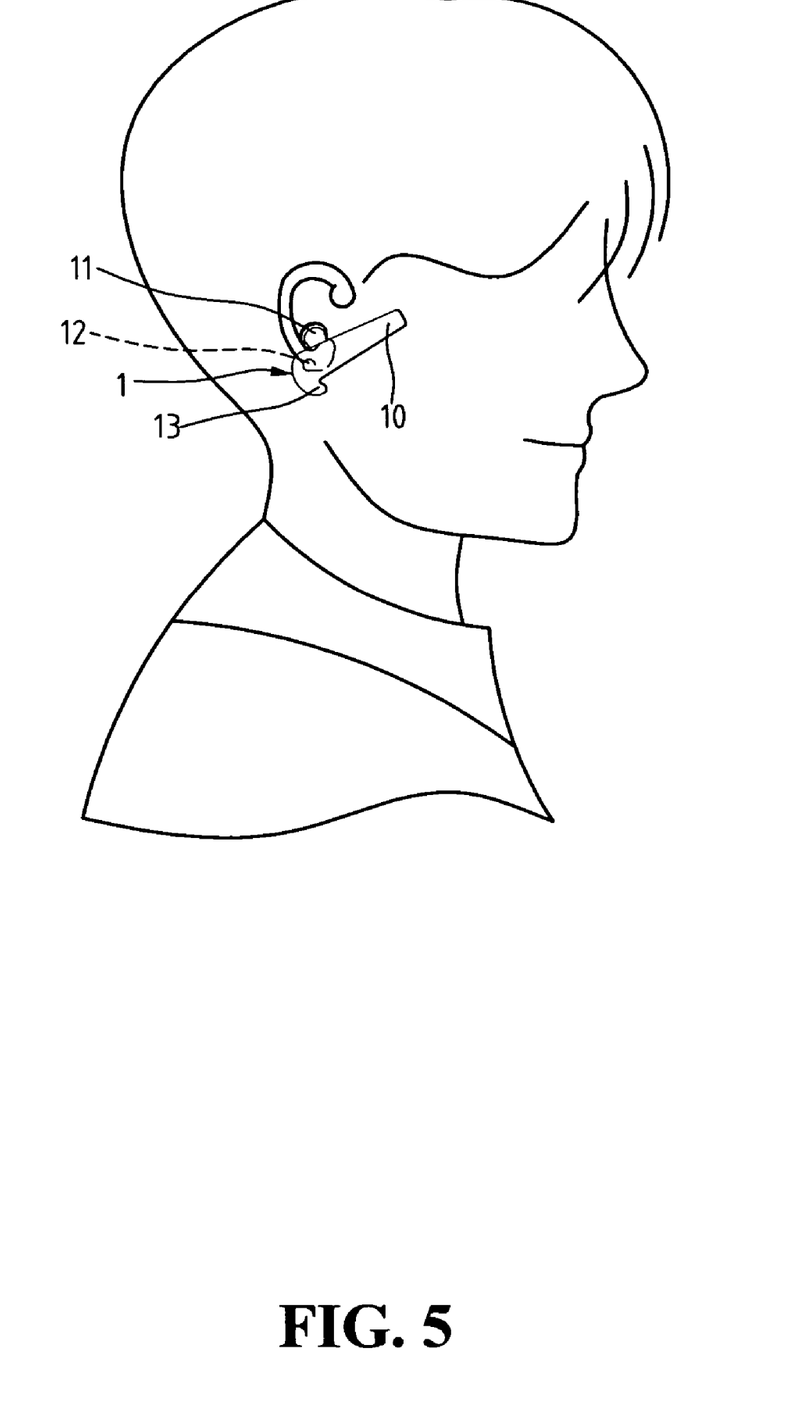
FIG. 5 is a schematic view showing the application of the headset in the first ear.
Figure 6:
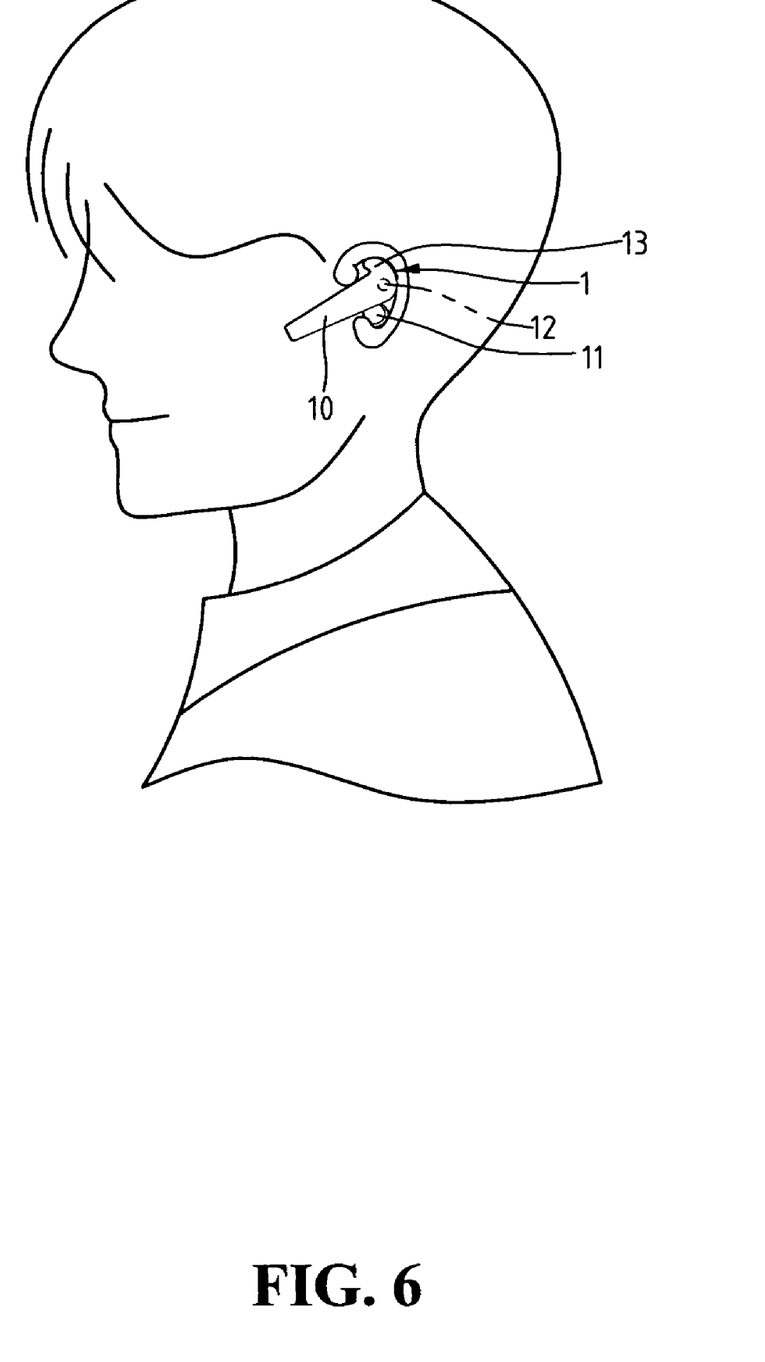
FIG. 6 is a schematic view showing the application of the headset in the second ear.

When the communication headset of the present invention is used in the first ear (the right ear), as shown in FIG. 5, the earphone 11 is inserted into the ear channel of the user and the top end of the boss 12 is located to urge against the cartilage above the earlobe or a joint between the earlobe and the cheek so that the headset of the present invention is stabilized. When the communication headset of the present invention is used in the second ear (the left ear), as shown in FIG. 6, first the headset of the present invention is rotated for 180 degrees. Then the earphone 11 is inserted into the ear channel of the left ear and the arcuate ledge 13 is urged against the concha cartilage on the top portion of the left ear so that the eat set of the present invention is stabilized.

Figure 7:
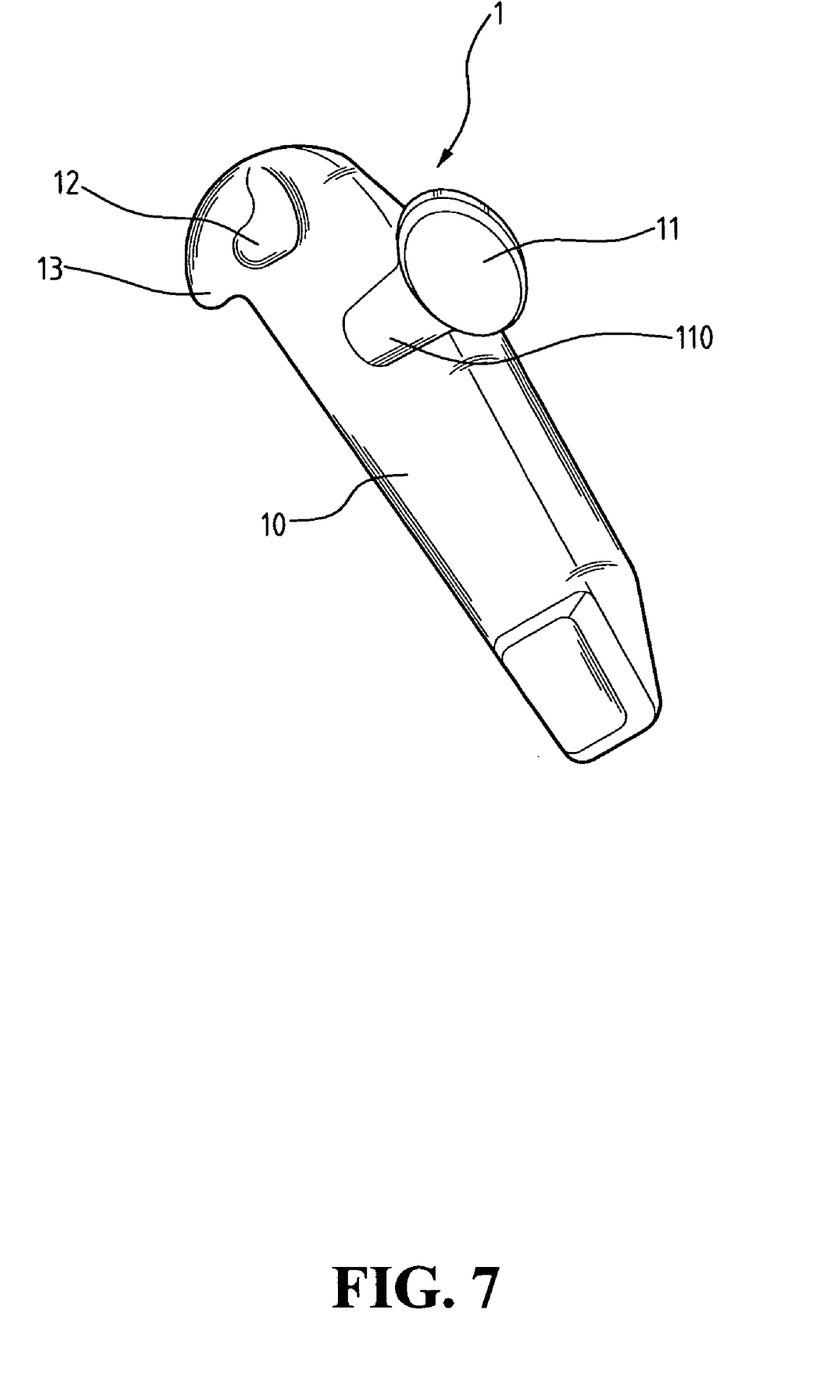
FIG. 7 is a perspective view showing a second embodiment of the headset of the present invention.

With reference to FIG. 7, the second embodiment of the present invention is shown and has a structure the same as that disclosed in the first embodiment. However, the relative position between the earphone 11 and the connection post 110 and between the boss 12 and the arcuate ledge 13 is opposite to each other.

Figure 8:
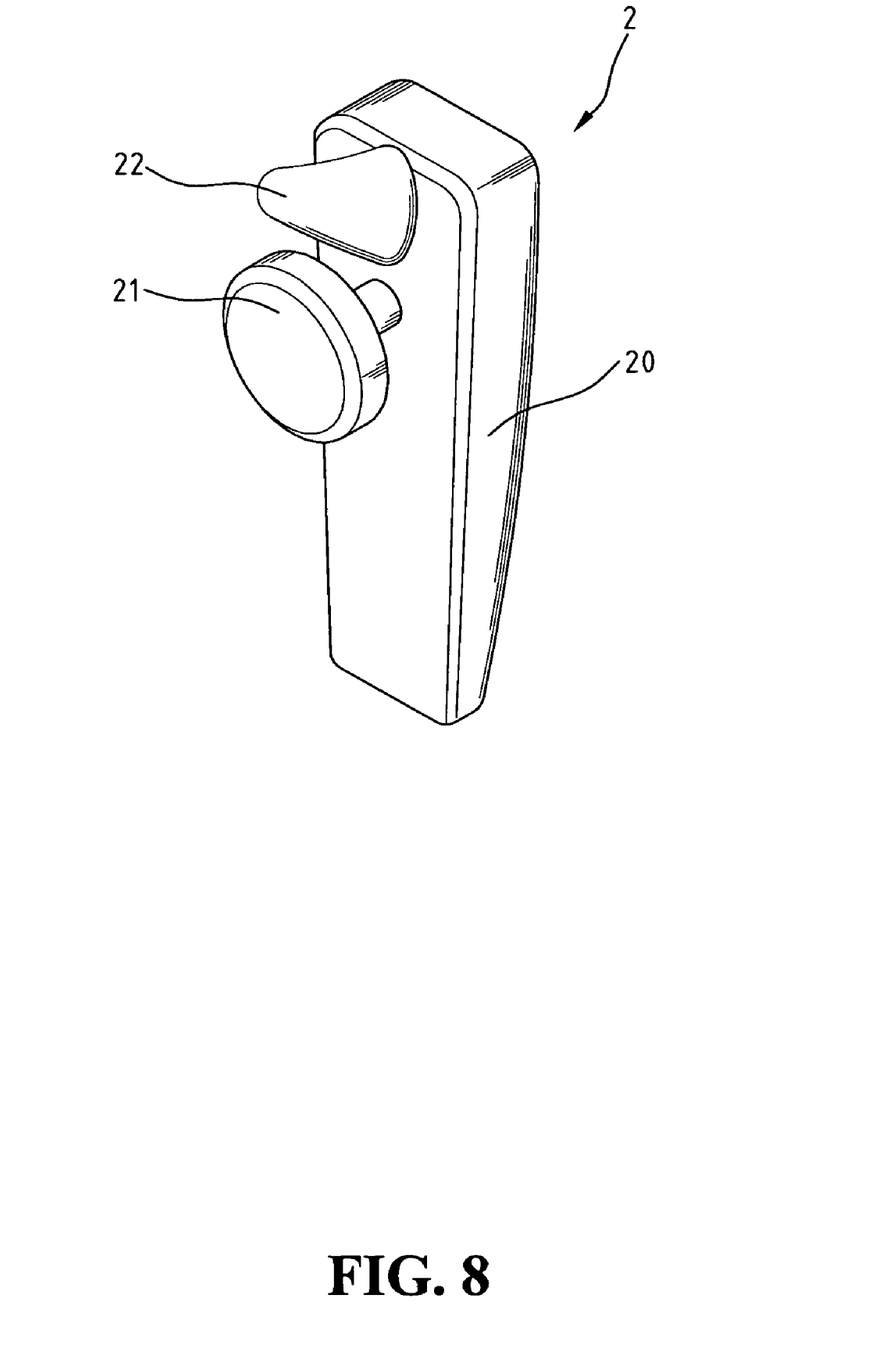
FIG. 8 is a perspective view showing a third embodiment of the headset of the present invention.

With reference to FIG. 8, the third embodiment of the present invention is shown and characterized in that the body 20 of the headset 2 is a slender and elongated element. A side face of the body 20 is provided with an earphone 21 and a boss 22 is formed on top of the earphone 21. The boss 22 has a dimension gradually reduced from the side face of the body 20 and bent toward a direction away from that of the earphone 21. A distance between the boss 22 and the earphone 21 is substantially equal or slightly larger than a distance between the ear channel and the concha of the ear.

Figure 9:
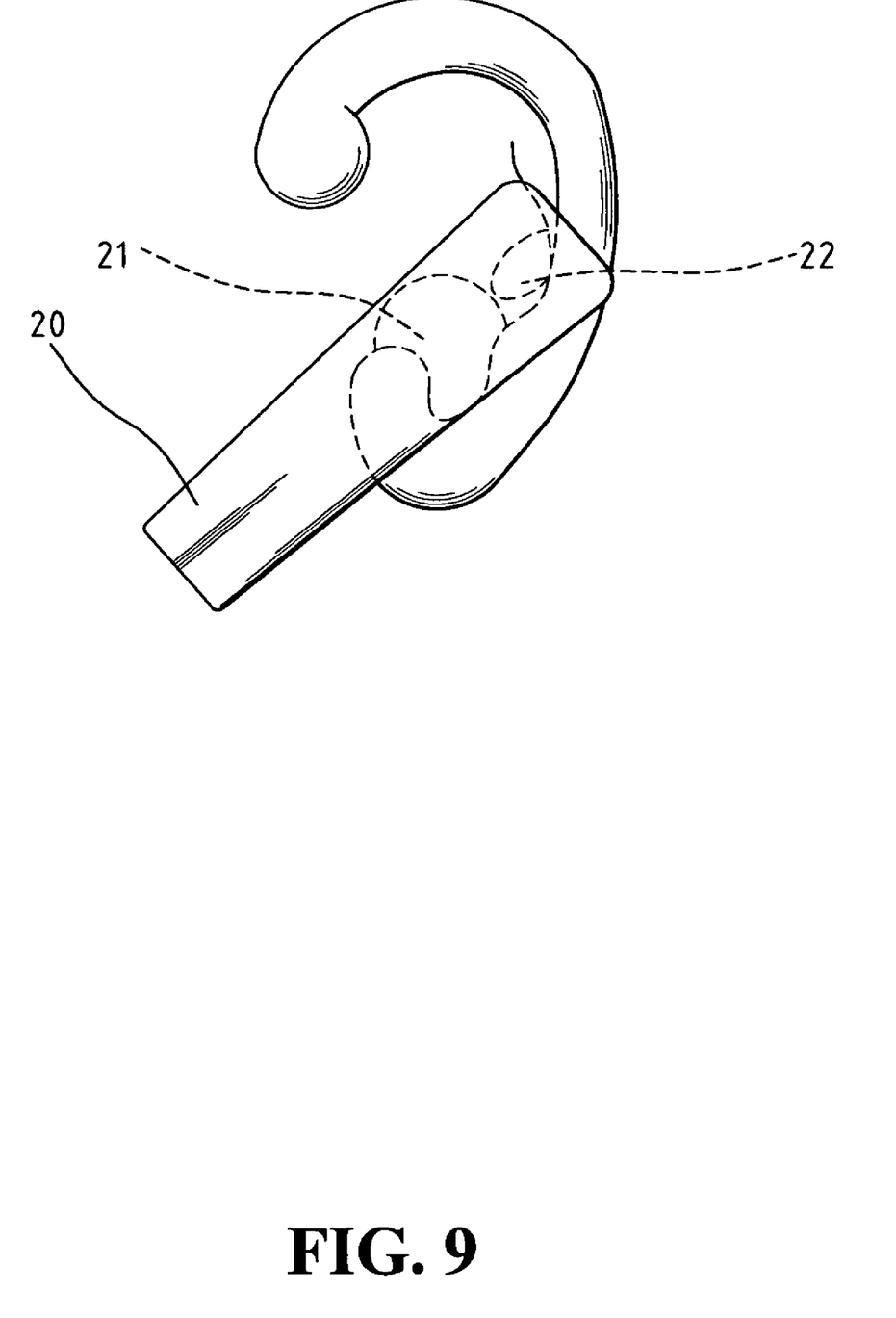
FIG. 9 a schematic view showing the application of the third embodiment in the right ear.

With reference to FIG. 9, when the headset of this embodiment is used in the right ear, the earphone 21 is inserted into the ear channel and the free end of the boss 22 is urged against the concha cartilage so that the headset of the present invention is able to use the positioning effect of both the earphone 21 and the boss 22 to provide a stabilized function when the headset is applied to the right ear. Further, because the earphone 21 and the boss 22 are located substantially in the center of the body 20, the headset of this embodiment can be applied to the left ear.

Figure 10:
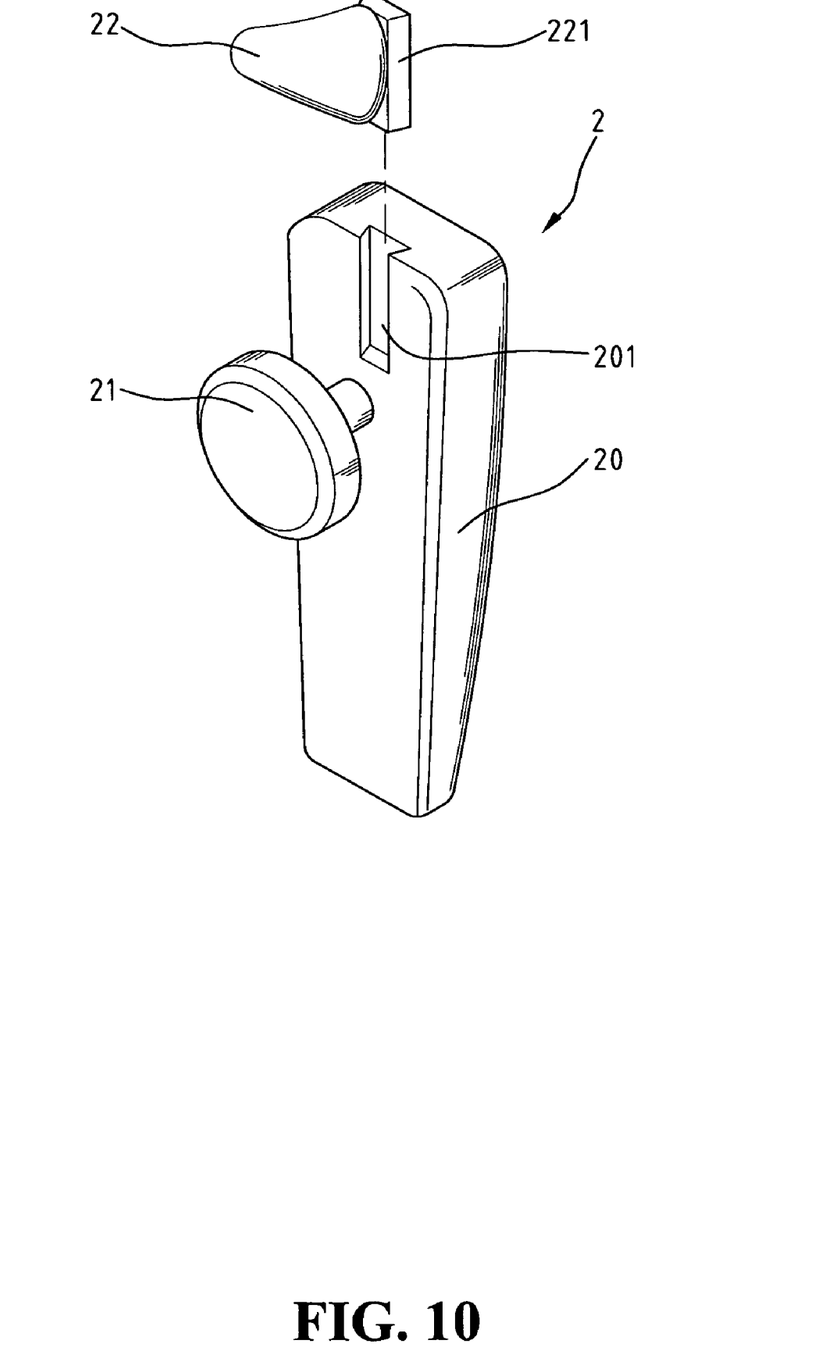
FIG. 10 is an exploded perspective view showing the fourth embodiment of the headset of the present invention.

With reference to FIG. 10, the fourth embodiment of the present invention is shown and has a structure substantially the same as that of the third embodiment shown in FIG. 8. However, the body 20 has a position adjusting recess 201 defined from a top end face to a position close to the earphone 21. The boss 22 has a sliding block 221 formed on a side of the boss 22 and away from the free end of the boss 22 to correspond to the position adjusting recess 201. Therefore, when the headset of the embodiment is in use, the user is able to place the sliding block 201 into the position adjusting recess 201 to allow the boss 22 to move relative to the earphone 22 so as to adapt to different ear size. The application of the earphone 21 is the same as the description used in FIG. 9. Thus no application of how the fourth embodiment is used is addressed.

Figure 11:
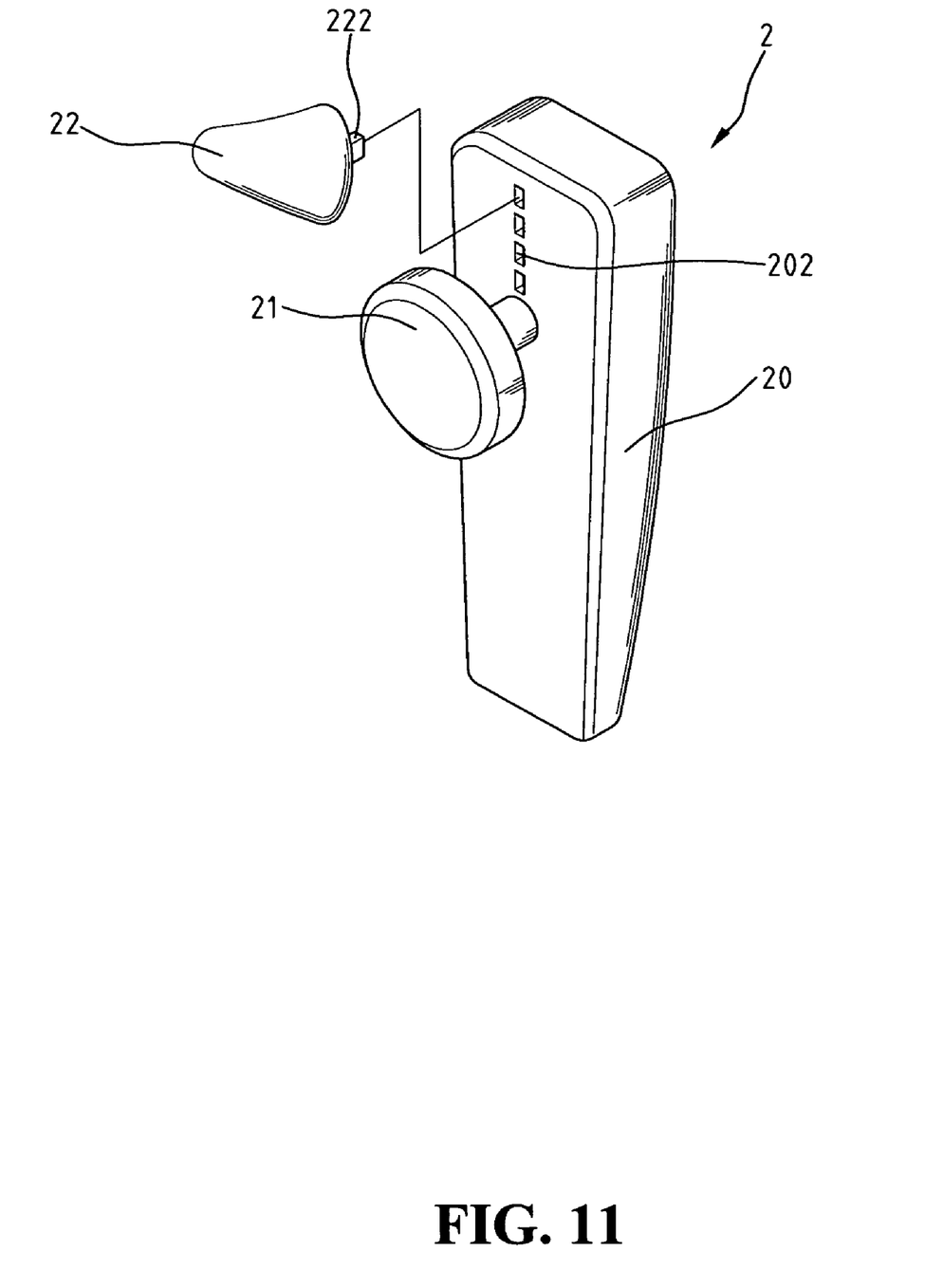
FIG. 11 is an exploded perspective view showing the fifth embodiment of the headset of the present invention.

With reference to FIG. 11, the headset of the fifth embodiment is shown and has a structure substantially the same as that of the fourth embodiment in FIG. 10. However, the position adjusting recess is now replaced with multiple apertures 202 and the sliding block is changed to an insert 222. Therefore, the user is able to place the insert 222 into a corresponding one of the apertures 202 to adjust the position of the boss 22 relative to the earphone 21 so as to adapt to different ear sizes.

In short, the headset of the present invention uses the boss and the arcuate ledge to position the earphone between the ear channel and the concha cartilage so that the user is able to comfortably use the headset of the present invention.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A headset having a body and an earphone securely connected to the body, the headset comprising an auxiliary positioning device provided on the body, the auxiliary positioning device including a boss extended out from the body above the earphone and an arcuate ledge extended on a peripheral edge of a top portion of the body so that when the earphone is inserted into an ear channel of a first ear, the boss is positioned against the cartilage above the earlobe of the first ear, and when the earphone is inserted into an ear channel of a second ear with the headset rotated 180 degrees, the arcuate ledge is positioned against the cartilage on an upper portion of the second ear so as to position the headset.

2. The headset as claimed in claim 1, wherein a connection post is extending from a side face of the body to securely connect to the earphone.

3. The headset as claimed in claim 1, wherein a top end of the boss is flat.

4. The headset as claimed in claim 1, wherein a distance between the boss and the earphone is equal or slightly larger than that between the ear channel and the earlobe.

5. The headset as claimed in claim 1, wherein the arcuate ledge has a shape corresponding to a shape of the cartilage on the upper portion of the second ear.

6. The headset as claimed in claimed in claim 5, wherein a distance between the arcuate ledge and the earphone is slightly larger than that between the ear channel and the cartilage on the upper portion of the second ear.

7. A headset having a body and an earphone, the headset comprising a connection post extending from a side face of the body for connection with the earphone, and a boss provided on a top portion of the side face of the body and having an arcuate end face, whereby when in use, the earphone is inserted into an ear channel and the boss is urged against the cartilage of an ear so as to position the headset.

8. The headset as claimed in claim 7, wherein the connection post is formed on a center of the body so that the headset is usable on the left ear and the right ear of an user.

9. The headset as claimed in claim 7, wherein the boss is movable along the side face relative to the earphone so that a distance between the boss and the earphone is adjustable.

10. The headset as claimed in claim 9, wherein a position adjusting recess is defined on the side face from an end face of the body to a portion close to the earphone and the boss has a sliding block formed with the boss to correspond to the position adjusting recess so that the boss is movable relative to the earphone and a position adjustment effect between the boss and the earphone is achieved.

11. A headset having a body and an earphone, the headset comprising a connection post extending from a side face of the body for connection with the earphone, and a boss provided on a top portion of the body and having an arcuate end face, wherein the connection post is formed on a center of the body so that the headset is usable on the left ear and the right ear of an user; and wherein the body has multiple apertures defined in the side face of the body and the boss has an insert formed with the boss to correspond to one of the apertures so that the boss is movable relative to the earphone and a distance between the boss and the earphone is adjustable, whereby when in use, the earphone is inserted into an ear channel and the boss is urged against the cartilage of an ear to position the handset.

* * * * *